United States Patent [19]

Argentieri et al.

[11] 4,093,938
[45] June 6, 1978

[54] AIRCRAFT ALTITUDE ANNUNCIATOR

[75] Inventors: Michael A. Argentieri, West Orange; James Lionetti, Northvale, both of N.J.

[73] Assignee: Intercontinental Dynamics Corp., Englewood, N.J.

[21] Appl. No.: 733,180

[22] Filed: Oct. 18, 1976

[51] Int. Cl.² .............................................. G08G 5/00
[52] U.S. Cl. ........................... 340/27 R; 340/27 AT; 340/181; 340/221; 360/12
[58] Field of Search ............... 340/27 R, 27 AT, 221, 340/181; 360/12; 244/180; 73/178 R, 178 T; 235/150.2, 150.22; 364/433, 434

[56] References Cited

U.S. PATENT DOCUMENTS

| | | | |
|---|---|---|---|
| 3,538,264 | 11/1970 | Van Dyke | 340/27 R |
| 3,668,621 | 6/1972 | Boyd | 340/27 R |
| 3,715,718 | 2/1973 | Astengo | 340/27 R |
| 3,925,751 | 12/1975 | Bateman et al. | 340/27 R |
| 3,936,796 | 2/1976 | Bateman | 340/27 AT |
| 3,988,713 | 10/1976 | Bateman | 340/27 R |

*Primary Examiner*—John W. Caldwell, Sr.
*Assistant Examiner*—James J. Groody
*Attorney, Agent, or Firm*—Gottlieb, Rackman & Reisman

[57] ABSTRACT

There is disclosed an improved annunciator for verbalizing altitude-related messages during the descent of an aircraft. In the past, announcements such as "nine hundred," "eight hundred," etc. were made when the aircraft crossed a respective "hundreds" level. During circle-to-land maneuvers multiple announcements of the same level sometimes occurred, primarily due to small terrain variations which in effect caused the aircraft altitude to vary above and below a "hundreds" level. In accordance with the invention, the annunciator is enabled following a previous announcement only if the aircraft first passes through a mid-"hundreds" level, e.g., 750 feet. Terrain variations are usually no more than twenty feet or so; thus multiple announcements of the same level are inhibited.

18 Claims, 8 Drawing Figures

AIRCRAFT ALTITUDE ANNUNCIATOR

This invention relates to aircraft altimeters, and more particularly to annunciators for use therewith.

In our co-pending application Ser. No. 696,032, filed on June 14, 1976 and entitled "Aircraft Altitude Annunciator," which application is hereby incorporated by reference, there is disclosed an annunciator for use with an aircraft altimeter, the annunicator providing altitude-related verbal announcements for the pilot of an aircraft. Twelve different announcements are made.

The word "terrain" is heard when the aircraft descends through both the 2,000-foot level and the 1,000-foot level. As the aircraft descends past the 900-foot, 800-foot, etc. levels all the way down past the 100-foot level, nine different numerical announcements are heard: "nine hundred," "eight hundred," ... "one hundred." Display devices, such as that disclosed in Argentieri et al Pat. No. 3,890,614, issued on July 17, 1975, entitled "Integrated Radar-Pneumatic Altimeter Display Device", and marketed by the assignee of the present application under the trademark RAD/BAR, often include provision for the pilot to select a "decision height," an altitude which when reached results in the generation of an alarm signal. When the decision height is reached during descent of the aircraft, the annunciator disclosed in our co-pending application announces the word "minimum." (Since the setting of the decision-height level is at the option of the pilot, the word "minimum," or some equivalent message, is verbalized rather than a numerical altitude.)

Lastly, the message "glideslope" is called out when a deviation from the glidescope is detected by a conventional glideslope receiver. As long as a true deviation persists, this announcement is heard repetitively. But the rate at which the announcement is heard, as well as its sound level, is a function of the extent of the deviation.

As described in our co-pending application, the system includes a priority structure. For example, the announcement "minimum" is more important than an announcement such as "two hundred," etc.; the "minimum" announcement has the highest priority. There are also other priorities, as well as certain lock-out features. For example, conventional glideslope receivers provide an indication whether the equipment is working properly, and if a valid glideslope signal is not being generated, then the "glideslope" announcements are inhibited.

Announcements are generated only during a descent; in the usual case there is little need to audibly inform the pilot of increasing altitudes. Thus for the proper operation of the annunciator, a mechanism is provided for determining that the aircraft is indeed descending. The vertical rate of movement can be determined by differentiating the altitude signal, a negative rate exceeding a threshold level being assumed to represent a descent condition. However, this simple approach is not the best because differentiators are inherently noisy and can give rise to false descent indications. Another approach is to derive an average of the negative rate signal, taken over a time interval several seconds long; only if the average negative rate signal exceeds a threshold level does the system assume that the aircraft is descending. But this approach also has its problems; during the several seconds that it takes to verify that the aircraft has started to descend, an announcement that should otherwise be heard may not be.

To make the system relatively immune to circuit noise, and yet in order to make the system sensitive to "trend" (descent) information which does not depend on measurements taken over an excessive time interval, a different approach is described in our co-pending application. A sampling of the altitude reading is taken every four seconds. The instantaneous altitude is continuously subtracted from the last-taken sample, and whenever there is a one-foot negative difference the system assumes that a descent is in progress. Thus a descent is detected almost as soon as it begins. However, the descent-indicating signal (referred to herein as the "negative-rate" signal) is not cut off on such an instantaneous basis. The difference must be less than 1-foot (or even of opposite sign) for approximately 1.5 seconds before the signal is cut off.

When flying over a hole in the terrain, for example, which is reflected in the radio altitude signal as an ascent, the negative-rate signal persists for 1.5 seconds; the momentary increase in the altitude signal — which really reflects terrain "noise" rather than a true ascent — is "filtered out" provided the condition does not persist for longer than 1.5 seconds. On the other hand, when flying over a building the altitude signal suddenly decreases and this does result in the instantaneous generation of the negative-rate signal. Since hitting a building is just as fatal as hitting the ground, terrain "noise" is not "filtered out" if it results in a decrease in the altitude signal.

The system logic is digital in nature; thus the radio altitude signal which is analog in form is converted to digital form before subsequent processing. The analog-to-digital converter which is used for this function may be the same one which controls the visual display. For a pleasing "flickerless" display which is up-dated as often as can be practically useful, the A/D converter output is up-dated at 0.4-second intervals. The A/D converter derives only "hundreds" and "tens" digits; the "units" digit is ignored except that the altitude is rounded out to the nearest "tens" digit.

Theoretically, a numerical announcement should be made only if two conditions exist simultaneously. First, the negative-rate signal must be present. Second, the radio altimeter signal must go through a "zero crossing," i.e., the altimeter reading must change, for example, from above 700 feet to below 700 feet. Such a condition is most easily detected by determining when the "tens" digit at the A/D output is 0. But if one A/D conversion takes place when the altitude is 710 feet and the next (0.4 seconds later) takes place when the altitude is 694 feet (690 feet when rounded out to the nearest "tens" digit), a not unusual rate, the zero crossing will be missed and the "seven hundred" announcement will not be made.

For this reason, a zero crossing is assumed to occur whenever the "tens" digit at the output of the A/D converter switches to 2, 1 or 0. The only way that a zero crossing can be missed is if the aircraft drops 30 feet or more in 0.4 seconds. This corresponds to a descent of 4500'/minute, a very high final descent rate. The skipping of a number actually adds emphasis to the high rate.

To avoid unnecessary multiple announcements of the same altitude (in 100-foot increments), the logic is designed such that for a descent through any 30-foot range above a "hundreds" level, only one announcement is made. Variations in altitude within the 30-foot range do not generate numerical messages. Even a descent below the hundreds level, followed by an ascent into the range and another descent, should not trigger a message. A message is generated only during a descent, when one of the 30-foot ranges is first entered from above.

The early detection of a zero crossing (at an altitude of up to 24 feet above a true hundreds level, since at this level the A/D "tens" output switches from 3 to 2) provides an additional advantage. As described in our co-pending application, messages are generated only at the start of successive 1-second intervals. The early detection of a zero crossing compensates for the up-to-one-second lag in the start of a message, so that the "hundreds" message which is generated is actually heard closer in time to the true zero crossing.

These are other features of the system which are important from a human engineering standpoint. For example, "glideslope" announcements are inhibited at altitudes below the decision height and above 1,000 feet for reasons which are described in our co-pending application. Also, if the aircraft falls from above 700 feet, for example, to below 500 feet very rapidly, after the "700" announcement the "500" announcement will be heard. The "600" announcement, which has become irrelevant, is locked out until the "700" announcement has been completed.

The presence of the negative-rate signal is necessary only to trigger numerical announcements. The "minimum" message, for example, is heard even if the descent is so slow that the negative-rate signal is not developed. Passage through the decision height is such an important event, that the only condition for triggering the "minimum" message is that the radio altitude go below the pre-set decision height. The "terrain" and "glideslope" announcements are similarly independent of the negative-rate signal. Also, as described in our co-pending application, at the end of any message, any other announcement-worthy events which were detected during play of the last message are ignored; the event-registering devices are reset. (It is by doing this that after the "700" message the "500" message can be heard, to the exclusion of the "600" message, if appropriate.) An exception to this is the "minimum" message. A descent through the decision height is registered when it occurs. As soon as the message in progress (if any) is heard, the "minimum" announcement is made.

Although the aircraft altitude annunciator of our co-pending application has been found to be satisfactory in almost all respects, one problem has been encountered with its use. It has been found that when an aircraft equipped with the unit executes a circle-to-land maneuver (under 1,000 feet above ground), as opposed to a normal downward trend approach, multiple call-outs of the same radio altitude number are sometimes generated. The reason for this is the following.

An altitude announcement is triggered when a zero crossing is detected. A zero crossing is detected when the aircraft first descends through a level which is 25 feet above a true "hundreds" level. (Since the A/D converter "tens" digit output is rounded out to the nearest "tens" digit, when the altitude drops below X25 feet, where X is any digit, the "tens" digit switches from a 3 to a 2.) As long as the aircraft remains below 25 feet above the true "hundreds" level and above 5 feet beneath the true "hundreds" level, another zero crossing trigger pulse will not be generated; as long as the "tens" digit switches back and forth between 2, 1 and 0, no zero crossing pulses are generated after the first. In effect, there is a band of 30 feet around each true "hundreds" level (most of the band being above the level) which results in the detection of only a single zero crossing as long as the aircraft remains in the band. But if the aircraft ascends above the band or descends below it, and then re-enters the band, another zero crossing event may be detected. For example, if the aircraft drops below the 30-foot band around a true "hundreds" level and then ascends into the band during the at least 1.5 seconds that the negative-rate signal persists after the ascent begins, another announcement of the same "hundreds" level will be triggered. The announcement is not necessary because that "hundreds" level was just heard; nevertheless, because the negative-rate signal persists for at least 1.5 seconds, the same announcement will be heard again. (This happens only if the ascent into the 30-foot band surrounding the "hundreds" level involved occurs during the approximately 1.5 seconds following the start of the ascent.) Similarly, if the aircraft ascends above the 30-foot band around the true "hundreds" level and then starts to descend, another zero-crossing pulse is generated and the previously heard announcement will be repeated. In this case, it is not the persistence of the negative-rate signal for at least 1.5 seconds following the start of the ascent which results in the triggering of the announcement. It will be recalled that the negative-rate signal is generated immediately as the aircraft starts to descend. Thus all that it takes to re-trigger the same announcement is for the aircraft to rise above the 30-foot band around the true "hundreds" level and to then descend once again into the band. It is during circling that the aircraft is most prone to moving in and out of the 30-foot band around a true "hundreds" level, the relative altitude above the ground usually varying up to about 20 feet as a result of terrain variations even though the pilot attempts to maintain a fixed altitude.

The multiple announcements of the same altitude provide little additional information to the pilot; on the contrary, some pilots find them objectionable. It is a general object of the present invention to modify the annunciator disclosed in our co-pending application so as to substantially eliminate repetitious announcements.

Briefly, in accordance with the principles of our present invention, the zero-crossing detection circuitry is modified so that a zero-crossing pulse is not generated simply upon the aircraft ascending or descending into the 30-foot band around a true "hundreds" level. Another condition is imposed, this condition being that the aircraft must also first pass through a mid-"hundreds" level, e.g., 750 feet. (In order that such a 50-crossing level not be missed, as a result of the low sampling rate, a technique is employed which is similar to that which prevents the missing of a zero crossing; a 50-crossing is detected whenever the aircraft first enters a band which extends from 25 feet above a true mid-"hundreds" level to 5 feet below it, i.e., whenever the "tens" digit first switches to a 7, 6 or 5.) Thus if the aircraft has entered the band around a true "hundreds" level, resulting in the generation of an announcement, and has then ascended above the band, simply descending back into the band is not enough to trigger the announcement. The aircraft must first ascend to a level at least 45 feet above the true "hundreds" level before the zero-crossing detection circuitry is enabled. If the aircraft does not first ascend to this height, another zero crossing will not be detected when the aircraft descends back into the 30- foot band around the true "hundreds" level. Similarly, when the aircraft leaves the band around a true "hundreds" level during a descent, in order for the zero-crossing detection circuit to be enabled, the aircraft must first descend all the way down to the next mid-"hundreds" level (at least down to 25 feet below the true "hundreds" level). It is only following such a drop that an ascent into the band around the true "hundreds" level will result in a repetitious announcement (as opposed to an announcement of the next lowest "hundreds" level following a continued descent of the aircraft into the band around the next lowest "hundreds" level.)

This enabling of the zero-crossing detection circuit by the aircraft passing through a mid-"hundreds" level is not a perfect guarantee that multiple announcements of the same altitude level will not be heard. For example, following a "700" announcement, if the aircraft ascends to a height of 750 feet and then descends once again into the 30-foot band around the true "700" level, another "700" announcement will be heard. However, in actual practice multiple announcements are rarely heard. This is because during a normal circle-to-land maneuver, terrain variations are not usually larger than 20 feet or so, thus substantially eliminating the possibility of alternate triggerings of the 50-crossing and zero-crossing detection circuits.

Further objects, features and advantages of our invention will become apparent upon consideration of the following detailed description in conjunction with the drawing, in which.

Figure 1:
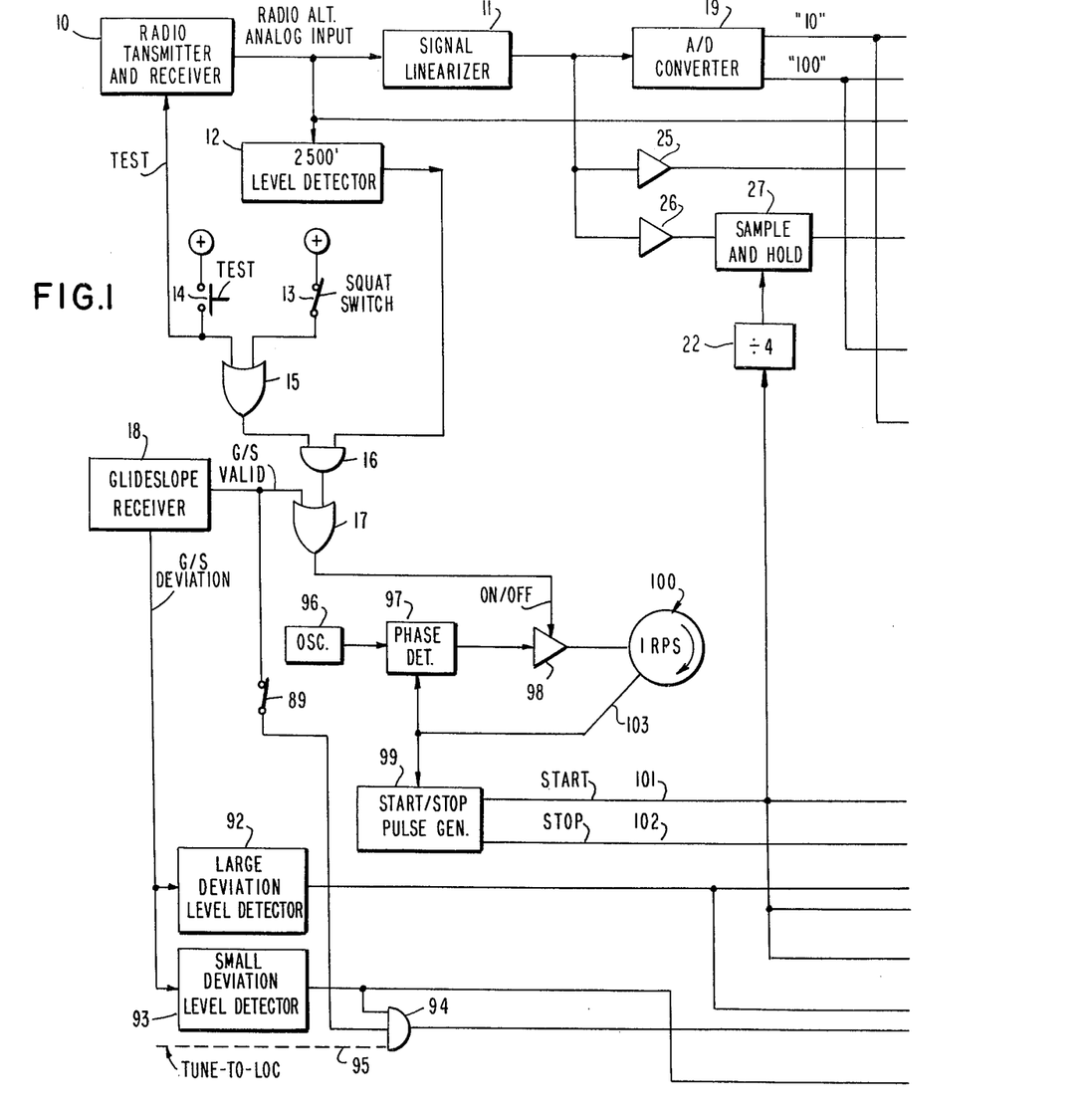
FIGS. 1-7 are the same as the same-numbered figures in our above-identified co-pending application.
Figure 2:
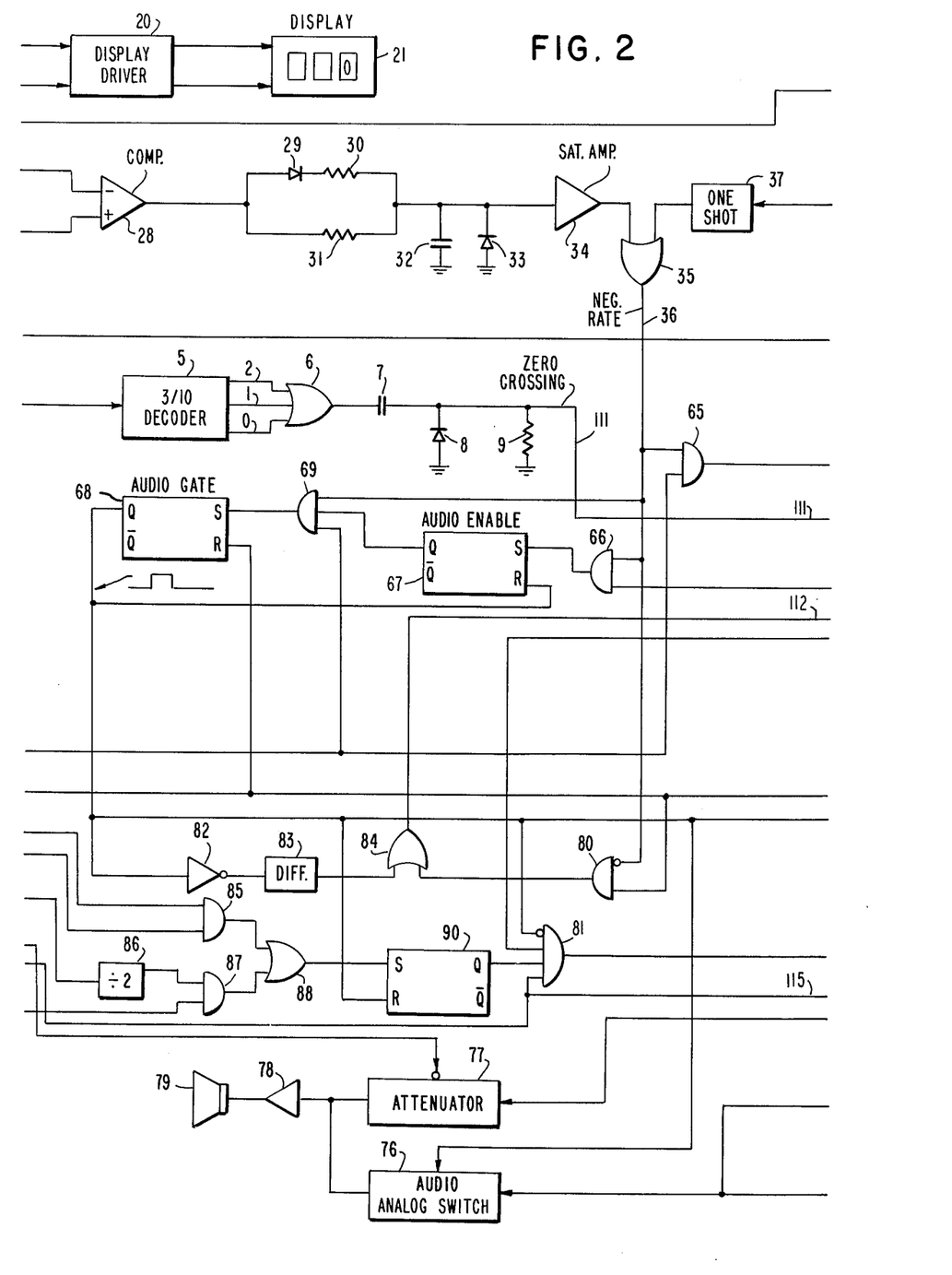
Figure 3:
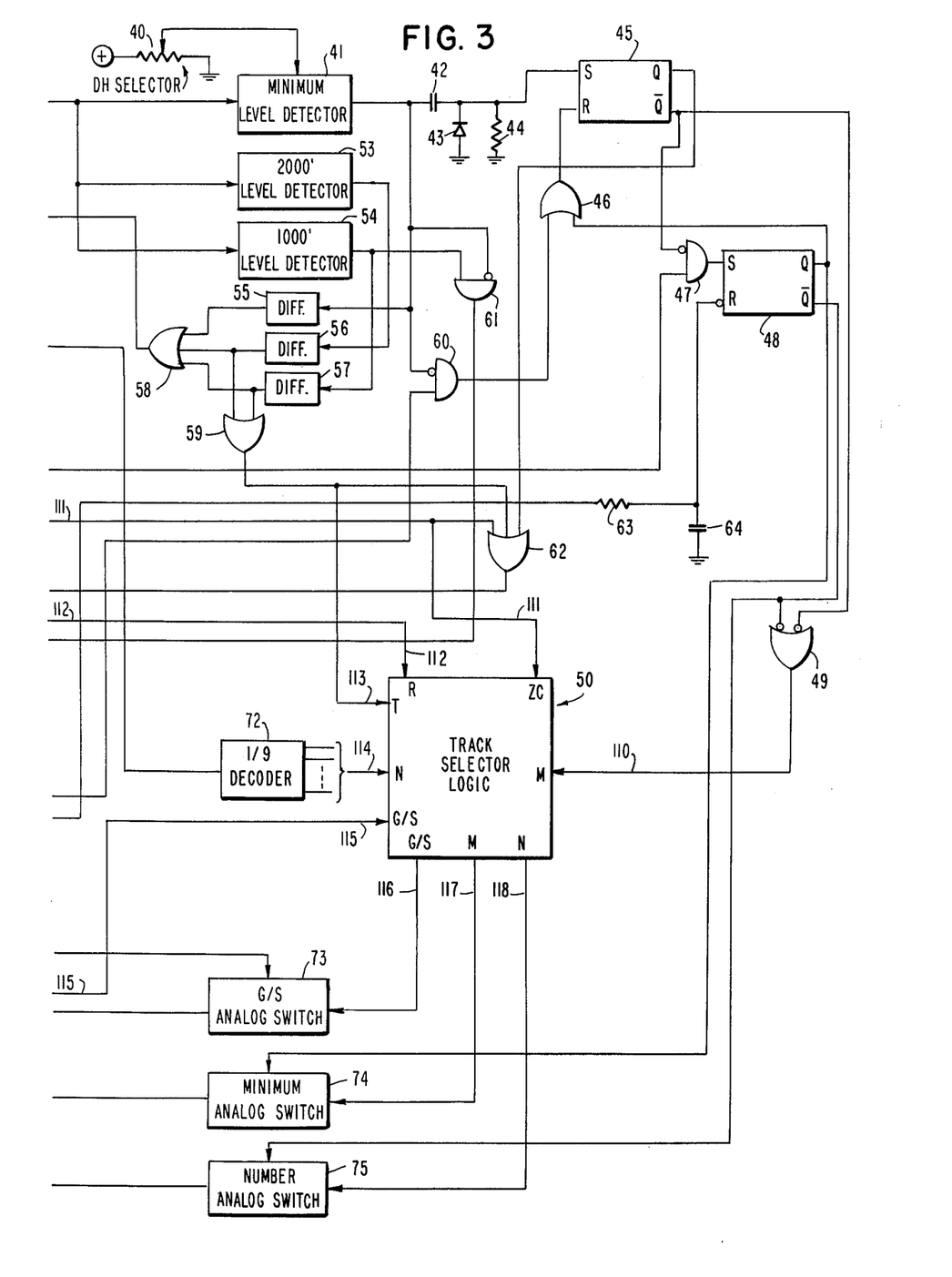
Figure 4:
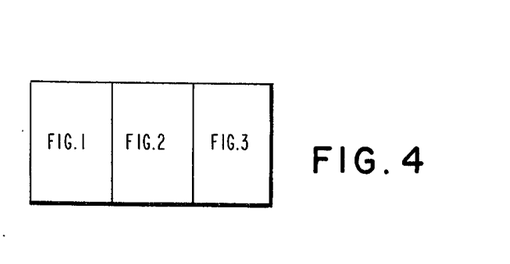
Figure 5:
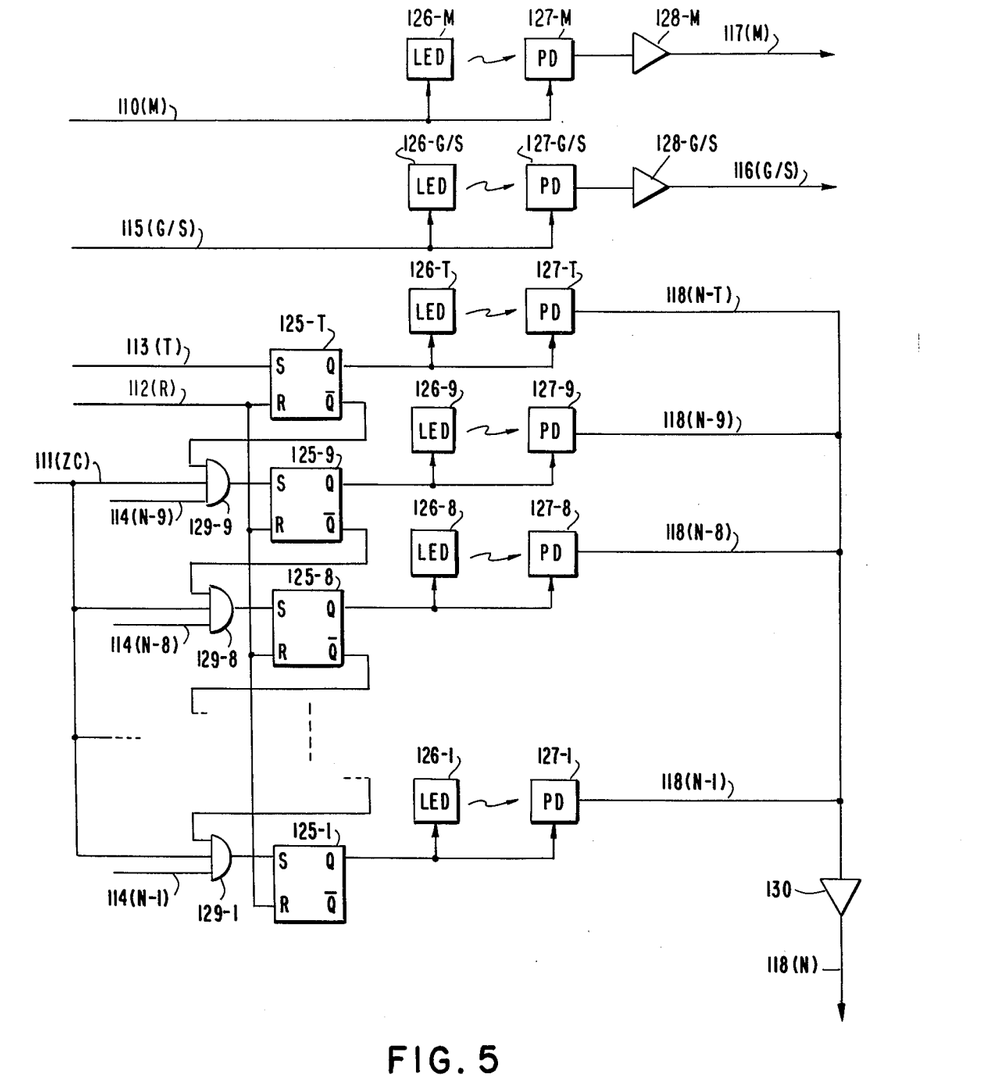
Figure 6:
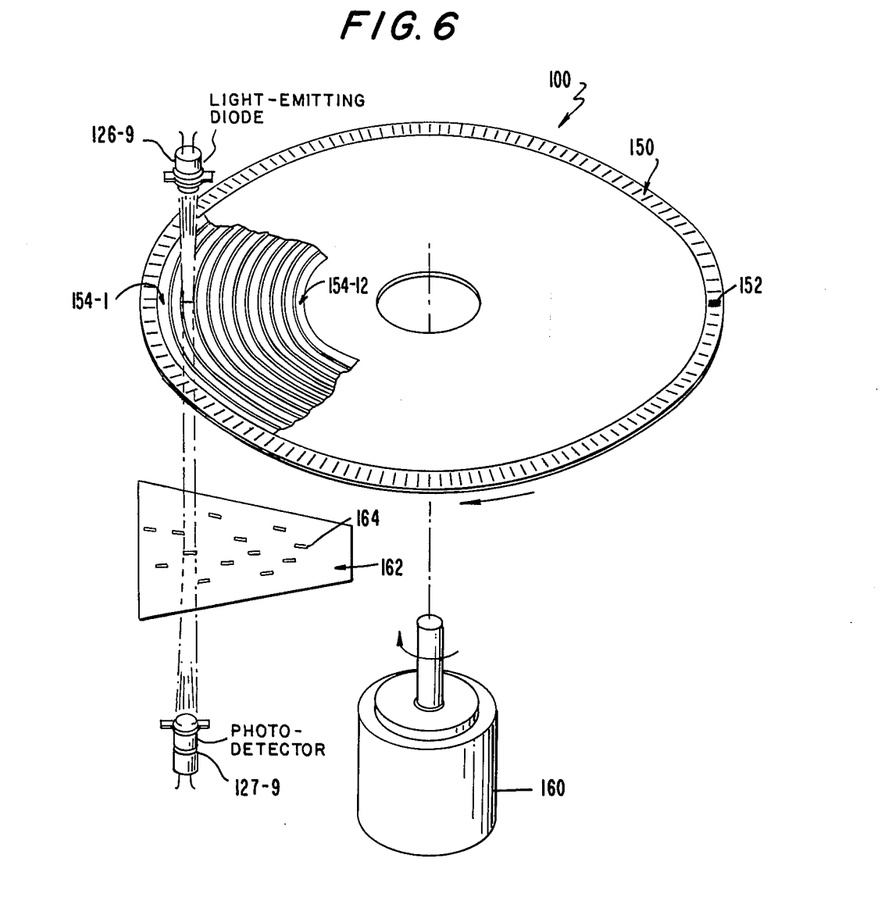
Figure 7:
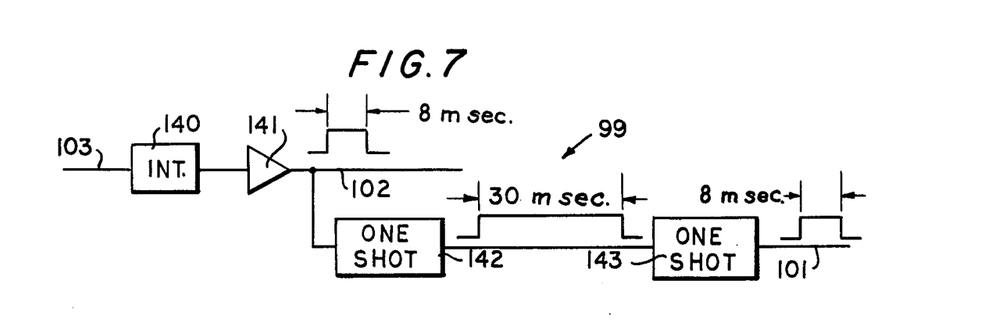

With reference to FIGS. 1-7, FIGS. 1-3, arranged as shown in FIG. 4, depict the logic of the annunciator disclosed in our co-pending application, FIG. 5 depicts the circuitry of the track selector logic block 50 of FIG. 3, FIG. 6 depicts the message-generating sub-system used in the system of FIGS. 1-3, and FIG. 7 depicts the circuitry included in the start/stop pulse generator 99 of FIG. 1. A complete description of the annunciator of FIGS. 1-7 is to be found in our co-pending application, and the following brief description is concerned primarily with the operation of those elements which give rise to the multiple-announcement problem.

The radio altitude analog signal at the output of radio transmitter and receiver 10 (FIG. 1) is applied to the input of signal linearizer 11. A typical radio altitude analog signal is non-linear, the rate of increase of the signal as a function of altitude increasing with decreasing altitude. The signal linearizer converts the analog input signal to an analog signal which is a linear function of altitude. The analog altitude signal at the output of signal linearizer 11 is applied to the input of analog-to-digital converter 19. The converter provides two outputs, up-dated every 0.4 seconds, which represent the "tens" and "hundreds" digits of the overall altitude. (Typically, each of the outputs consists of a 4-bit BCD signal.) The two signals are applied to the inputs of a conventional display driver 20 whose outputs drive a display 21, such as that shown in the above-identified Argentieri et al patent. It should be noted that the "units" digit of the display is always 0; it is only the "tens" and "hundreds" digits which are changed. There is no need to provide a display whose resolution is greater than 10 feet.

The "tens" digit output of A/D converter 19 is applied to the input of 3-out-of-10 decoder 5. This decoder has three outputs, the potential of each of which is high whenever a respective "tens" digit (0, 1 or 2) is represented at the input of the decoder. The three outputs are applied to inputs of OR gate 6. Thus the output of the OR gate is high whenever any one of the three decoder outputs is high. Capacitor 7, diode 8 and resistor 9 function as a differentiator so as to generate a short positive pulse whenever one of the decoder outputs first goes high. The capacitor charges and only one short pulse (referred to as the "zero-crossing" pulse) is generated for as long as at least one of the three decoder outputs remains high, the pulse occurring when the first of the 3 outputs goes high. Thus even though one of the decoder outputs may go low, another zero-crossing pulse is not generated if another of the three decoder outputs goes high at the same time. It is in this way that a single zero-crossing pulse is generated on conductor 111 whenever the aircraft enters the "30-foot range" which is "above" one of the "hundreds" levels. (The term "above" should not be taken literally. Because A/D converter 19 switches its "tens" output from 3 to 2 when the altitude drops to below 25 feet above a "hundreds" level, and switches its "tens" output from 0 to 9 when the altitude drops to below 95 feet above the next lowest "hundreds" level, the zero-crossing pulse is actually generated when the aircraft is somewhere between 5 feet below and 25 feet above a "hundreds" level.) As long as the aircraft remains within this range, no other zero-crossing pulse is generated, even though the "tens" digit may switch between 0, 1 and 2. It is this single zero-crossing pulse that triggers a message.

The pulse on conductor 111 is extended to the ZC input of track selector logic 50 to control the generation of a message. The reason for generating a zero-crossing pulse when the "tens" digit in the radar-altitude signal first switches to a 2 or 1, as well as a 0, is as described above. With an analog-to-digital conversion rate of 0.4 seconds, it is possible to "miss" a zero crossing if all that is looked for is a true "zero" in the "tens" position. (With faster conversion rates the "2" output of decoder 5, and even the "1" output, may not be necessary.)

The analog altitude signal at the output of signal linearizer 11 is applied to the input of each of buffer amplifiers 25 and 26. The start pulses on conductor 101 are extended to the input of divide-by-four circuit 22 (which is simply two flip-flops in series), so that pulses at the output of circuit 22 are generated at the rate of one every four seconds. Each of these pulses triggers the operation of sample-and-hold circuit 27 which samples the altitude signal and then holds that sample at its output for the next four seconds. The output of the sample-and-hold circuit is applied to the plus input of comparator 28. The instantaneous altitude signal, at the output of amplifier 25, is applied to the minus input of the comparator. The output of the comparator is positive whenever the potential at the plus input is greater than the potential at the minus input by an amount which represents a 1-foot difference between the previously taken sample and the instantaneous level represented at the minus input.

It should be noted that even during a steep descent the output of the comparator is not always high. Every four seconds, when a new sample is taken, the two inputs to the comparator are necessarily equal. Thus the comparator output goes low, and it is only as the aircraft continues to descend, after the signal at the minus input of the comparator drops sufficiently below the level held at the plus input, that the comparator outputs goes high again. However, the changes in the comparator output are smoothed so that the negative-rate signal on conductor 36 persists.

Resistor 31 is of much greater magnitude than resistor 30. Whenever the output of the comparator is high, diode 29 conducts and the parallel impedance of resistors 30 and 31 is relatively small. These resistors, together with capacitor 32, comprise an integrator and the capacitor rapidly charges. Saturating amplifier 34 generates a two-level output. As long as the voltage across capacitor 32 exceeds a minimum level, the output of amplifier 34 is high; otherwise, the output is at ground potential. Thus as soon as the output of comparator 28 goes high, capacitor 32 charges almost instantaneously and OR gate 35 operates. Conductor 36 (NEGATIVE RATE) goes high in potential to indicate that should the system register the need to render a numerical-value announcement, it may be made inasmuch as the aircraft is descending.

At 4-second intervals, the output of comparator 28 goes low as described above. At this time diode 29 is reverse-biased, and capacitor 21 discharges through relatively large-magnitude resistor 31. It requires 1.5 seconds after the comparator output goes low before the capacitor discharges sufficiently so as to cause the output of saturating amplifier 34 to go low. Since during a normal descent the aircraft drops 1 foot within 1.5 seconds, the output of comparator 28 goes high before amplifier 34 turns off and the negative-rate signal remains high continuously. The only time that the negative-rate signal goes low is when 1.5 seconds have gone by without the instantaneous altitude having been less than the previously taken sample by 1 foot.

The "hundreds" output of analog-to-digital converter 19 is extended to the input of one-out-of-nine decoder 72. This decoder energizes one of its nine outputs (corresponding to the messages "900," "800," . . . "100") depending upon the digit value in the hundreds position of the output of converter 19. The nine outputs of decoder 72 are extended over cable 114 to nine "N" inputs of the track selector logic. After one of the decoder outputs goes high, the next zero-crossing pulse sets a respective flip-flop in the track selector logic which then controls the out-putting of a respective numerical message. (As soon as the message is heard, the reset pulse applied to the R input of the track selector logic resets the flip-flop; the flip-flop is not set once again by the positive potential which may remain on the respective decoder output unless another zero-crossing pulse is generated.)

It is not necessary for an understanding of the present invention to review the manner in which the "terrain", "minimum" and "glideslope" announcements are generated. However, a brief review of the manner in which the numerical-value messages are generated is appropriate. The audio enable flip-flop 68 is placed in the 1 state whenever a high potential appears at its S input. It is switched back to the 0 state when a positive potential is applied to its R input. A zero-crossing pulse on conductor 111 is extended through OR gate 62 to one input of AND gate 66, the other input to which is connected to the NEGATIVE RATE conductor 36. This conductor is high whenever a true descent is detected by the sample-and-hold and related circuits.

When both inputs to AND gate 66 are energized, the output goes high to set the audio enable flip-flop 67 in the 1 state. The Q output of the flip-flop goes high and thus enables one input of AND gate 69. Another input to this gate is connected to the NEGATIVE RATE conductor 36 which is high whenever one of the announcements is to be made. The third input to gate 69 is connected to start conductor 101. Pulses appear on start conductor 101 at one-second intervals, at the start of successive message playing cycles. Thus at the start of the next one-second message-playing cycle which follows the initial operation of OR gate 62, a positive pulse is applied to the set input of audio gate flip-flop 68, and its Q output goes high.

The Q output of the audio gate flip-flop is extended to the control input of audio analog switch 76. The outputs of minimum analog switch 74 and number analog switch 75 are both tied together at the input of audio analog switch 76. Analog switch 74 is turned on whenever a "minimum" announcement is to be made, and analog switch 75 is turned on whenever a numerical announcement is to be made. Only one of the two analog switches operates to extend the respective message through analog switch 76 and output amplifier 78 to speaker 79. Whenever analog switch 76 is operated, analog switch 73 is held off so that "glideslope" announcements are not also extended to the input of amplifier 78. Audio analog switch 76 is turned on at the start of each message-playing cycle during which an announcement is to be made, the announcement being preceded by the generation of a start pulse on conductor 101 which sets audio gate flip-flop 68 in the 1 state.

At the end of the announcement, a stop pulse appears on conductor 102, the stop pulse being applied to the reset input of flip-flop 68. At this time the Q output of the flip-flop goes low, and audio analog switch 76 is turned off.

Inverter 82 functions to invert the pulse at the output of the audio gate flip-flop 68 so that each pulse, of a little under 1-second in duration, at the output of the inverter is a negative pulse. Differentiator 83 differentiates this pulse to derive a negative spike at the start of the message-playing cycle and a positive spike at the end of it. Only the positive spike is extended through OR gate 84 over conductor 112 to the reset input of track selector logic 50. The Q output of audio gate flip-flop 68 is connected to the reset input of audio enable flip-flop 67. Thus while the stop pulse itself resets audio gate flip-flop 68, audio enable flip-flop 67 is reset at the beginning of the outputting of a message, a message being outputted during the time that the Q output of audio gate flip-flop 68 is high.

Whenever a numerical-value message is to be played, a pulse appears at the ZC input of track selector logic 50. One of the nine N inputs from decoder 22 is also high. This condition selects one of the nine numerical-value messages for play and out-putting over conductor 118. Although the disc containing the announcements rotates continuously and the playback circuits associated with the numerical-value announcement to be heard are turned on as soon as the ZERO CROSSING conductor 111 is pulsed, the only playback signal which is heard is that which is bounded by the approximately 1-second pulse at the Q output of audio gate flip-flop 68 since it is only when the Q output is high that audio analog switch 76 is turned on. And since it is the start pulse and the stop pulse which determine the bounds of the pulse at the Q output of the flip-flop, these pulses are generated from the same disc which contains the messages, and the two pulses on the disc bracket all of the messages, it is apparent that analog switch 76 passes a numerical-value message only from the start of the message through its end. At the end of the message, the pulse at the output of OR gate 84 is applied over conductor 112 to the reset input of the selector logic, and resets the circuits in the track selector logic which controlled the out-putting of the particular numerical value-message which was heard.

In the event a zero crossing corresponding to a descent through a particular level is detected while an announcement corresponding to the next higher level is being out-putted, the newly-detected zero crossing is not "registered" by the track selector logic 50 (FIG. 3). For example, if the "700" announcement is being played while the "600" zero crossing is detected, the "600" playback circuits in the track selector logic are not turned on. The aircraft must be descending at so fast a rate that a zero crossing at the "500" level may well be detected shortly. Rather than to risk the possibility of delaying the "500" announcement in favor of the "600" announcement, the "600" announcement is not played at all; the system is primed for out-putting the "500" announcement at the earliest possible time.

The track selector logic 50 is shown in detail on FIG. 5. Associated with each of the 12 message tracks are a light emitting diode element and a photo-detector element. (The mechanical arrangement will be described below in connection with FIG. 6.) Whenever a light-emitting diode is turned on, a light beam is extended through the respective track to the respective photo-detector element. The light beam is modulated by the recording in the respective track, the output of each of the twelve photo-detectors thus being an analog signal representative of a respective announcement.

The 13th track is a timing track, and the respective light emitting diode and photo-detector element are not shown in FIG. 5. These elements are always enabled since the timing pulses, as well as the start and stop pulses, must be derived continuously while motor 160 is running.

Conductor 110, connected to the M input of the track selector logic, goes high whenever a "minimum" announcement is required as detected by the operation of minimum level detector 41; the conductor is high in potential from the time that the detector first operates until the end of the next message cycle. The conductor is thus high for at least one second and up to a maximum of two seconds, since each message cycle is one second in duration. A high potential on conductor 110 energizes both light-emitting diode 126-M and photo-detector 127-M. The analog signal at the output of the photo-detector is amplified by amplifier 128-M and applied to conductor 117 at the M output of the track selector logic. The analog signal on conductor 117 thus represents the last part of one "minimum" message, depending upon when during the one-second message-cycle in progress level detector 41 first operates, followed by a full "minimum" message. It is flip-flop 48 which controls the out-putting of only the complete "minimum" message during the first complete message-playing cycle which occurs following the operation of minimum level detector 41.

Similarly, conductor 115, connected to the G/S input of the track selector logic, is high for controlling the operation of the light-emitting diode 126-G/S and photo-detector 127-G/S whenever AND gate 94 is operated. Although an analog signal representing the word "glideslope" thus appears on conductor 116 connected to the G/S output of the track selector logic for as long as AND gate 94 is operated, it is gate 81 which allows the message to be heard only when it is called for.

A positive pulse is applied on conductor 113 connected to the T input of the track selector logic when the aircraft descends below the 2000-foot level and also when it descends below the 1000-foot level. Conductor 113 is connected to set input of flip-flop 125-T, and consequently this flip-flop is set in the 1 state as soon as the need for a "terrain" announcement is detected. The Q out-put of the flip-flop is connected to light-emitting diode 126-T and photo-detector 127-T so that an analog signal corresponding to the "terrain" message appears on conductor 118(N-t) as soon as flip-flop 125-T is set in the 1 state. The signal is amplified by amplifier 130 and applied to conductor 118, connected to the N output of the track selector logic. Although flip-flop 125-T may be set in the 1 state in the middle of one message-playing cycle, the last part of the "terrain" message being played is not actually heard because audio analog switch 76 is turned on by audio gate flip-flop 68 only at the start of the next complete message-playing cycle. At the end of that cycle, the reset pulse on conductor 112, connected to the R input of the track selector logic, resets flip-flop 125-T so that light-emitting diode 126-T and photo-detector 127-T both turn off.

It will be noted that photo-detector 127-T is treated just as one of the other nine photo-detectors 127-9 through 127-1 which are associated with the nine numerical-value messages. The ten photo-detector outputs are tied together at the input of amplifier 130, and what appears on conductor 118 at the N output of the track selector logic is either the "terrain" analog signal or one of the nine numerical-value analog signals. The tying together of the photo-detector outputs is permissible because only one of the ten flip-flops 125-T through 125-1 is set in the 1 state at any one time so that only one of the photo-detectors generates an output signal at any one time. The other nine photo-detector outputs are effectively open-circuited and do not interfere with the signal being read out.

Each of the nine other flip-flops 125-9 through 125-1 has its set input connected to the output of a respective AND gate 114(N-9) through 114(N-1). One input for each of these nine AND gates is derived from a respective output of one-out-of-nine decoder 72. Thus only one of the nine flip-flops can be set at any one time, depending upon the "hundreds" digit at the output of analog-to-digital converter 19. Since a numerical-value message is to be read out only when a zero crossing is detected, the zero-crossing conductor 111 is connected to an input of each of the nine AND gates. The only AND gate which can operate, however, is that one whose input is connected to the respective high output of decoder 72.

It is not enough, however, for one of the flip-flops to be set in the 1 state if only its respective decoder output is energized when a zero crossing is detected. The third condition required for setting one of the nine numerical-value flip-flops is that the flip-flop representing the next highest level not be set. For example, if the "900" message is being heard (flip-flop 125-9 being set) when the aircraft descends through the 800-foot level, the zero-crossing pulse on conductor 111 is not extended through AND gate 114(N-8) to set flip-flop 125-8 in the 1 state. This is because the Q output of flip-flop 125-9 is connected to a third input of the AND gate and this output is low when flip-flop 125-9 is in the 1 state. The zero crossing is "ignored." Even after the "900" message is completed, the "800" message is not played because the respective flip-flop was not set in the 1 state when the most recent zero-crossing pulse was generated. The reason for this is that described above; if the descent is so rapid that another zero crossing occurs while one of the numerical-value messages is being heard, then the system remains ready to output the next lower level announcement as soon as it becomes apparent that it is necessary (with the constraint, of course, that the out-putting of any message can begin only at the start of a message-playing cycle so that there can be a delay of up to one second following the detection of an event which is worthy of an announcement before the announcement actually begins). In this regard, it should be noted that the Q output of the "terrain" flip-flop 125-T is connected to an input of AND gate 114(N-9). The "terrain" message is treated just like one of the numerical value messages. Depending on which of the nine numerical value flip-flops is set in the 1 state, only the respective light emitting diode and photo-detector are energized and only one of the ten "terrain" and numerical-value message signals is applied to the input of amplifier 130 at any given time. Just as the "terrain" message is actually first heard only at the beginning of a message-playing cycle, a selected numerical-value message is also heard starting only with the beginning of a message-playing cycle. At the end of the cycle, the respective flip-flop is reset.

FIG. 6 is an exploded view which depicts symbolically the disc 100 on which the various messages are recorded, as well as those elements associated with it which control playback of the various messages and the generation of the timing signals. The disc 100 contains 13 tracks. On the outer track 150 there are recorded timing signals, and the 12 verbal messages are recorded on the 12 inner tracks 154-1 through 154-12. The timing track is for the most part light-transmissive, but there are 100 discrete marks recorded on it. Each of these marks is narrow, except for mark 152 which is wider. Motor 160 rotates in the direction shown when amplifier 98 (FIG. 1) is on. As the disc rotates, a light beam from a respective light-emitting diode (not shown), which beam is confined within the inner and outer bounds of the timing track, is transmitted through the track and detected by a photo-detector (not shown). The output of the photo-detector appears on conductor 103 (FIG. 1). Each of the 100 timing pulses is operated upon by phase detector 97 for controlling the speed of disc 100. The start/stop pulse generator 99 operates on the wide pulse on conductor 103 which corresponds to the wide timing mark 152 on the timing track. When the leading edge of the pulse is detected, the pulse generator applies a short stop pulse to conductor 102. When the trailing edge of the pulse is detected, the pulse generator applies a short start pulse to conductor 101.

In addition to the light-emitting diode and photo-detector associated with the timing track, there are twelve other pairs corresponding to those shown in FIG. 5. Only one such pair, consisting of light-emitting diode 126-9 and photo-detector 127-9, is shown in FIG. 6. Each light-emitting diode directs a narrow light beam through a respective track, the light beam being detected by the associated photo-detecotr. In each case, the light beam is modulated by the respective track recording.

Underneath the disc 100 a mask 162 is provided. The mask contains 13 narrow slits. Through each slit there is transmitted only a narrow slice of a respective light beam. The reason for providing the slits is that each photo-detector should respond at any instant to light transmitted through only a narrow section of the respective track. In order to reproduce the frequency spectrum of the human voice, a frequency response of up to slightly more than 3.0 kHz is required. The poorest resolution is exhibited by the inner track, which, in the illustrative embodiment of the invention, has a circumference of approximately 3 inches. A 3.0-kHz wave recorded on a 3-inch track which rotates once per second has a physical wavelength of 0.001 inches. If the wave is to be detected, only a look through a narrow slice of it will suffice; if the "average" modulation is detected by looking at too wide a slice, the information will be completely lost. A slit having a width of 0.0003 inches in the direction of the track movement corresponds to approximately one-third of the wavelength and is sufficiently small to allow reconstruction of the recorded waveform. In the illustrative embodiment of the invention, the width of each slit is 0.0003 inches; it has been found that this is sufficiently narrow to allow all of the messages to be reconstructed.

It should be noted that the slits in mask 162 are not in line with each other along a single radius of the disc. Although it is possible to provide such a configuration, it would require the light-emitting diodes and the photo-detectors to be similarly in line with each other. In order that it not be required to mount the light-emitting diodes and photo-detectors close to each other (which makes it difficult to gain access to any one of them), or, in the alternative, to require the use of a disc whose diameter is larger than otherwise required, the light-emitting diodes and photo-detectors are offset from each other, in positions corresponding to the locations of the slits 164 in mask 162. This simplifies mounting of the light-emitting diode and photo-detector elements. It will be apparent that with such an arrangement the beginning of the various message tracks on the disc will not line up with each other along a single radius. In order to synchronize the start of any recording with the generation of the start pulse, the physical recordings have different starting locations on the disc. All that is required is that whenever the trailing edge of pulse 152 appears above the slit in the mask 162 corresponding to the timing track (i.e., whenever a start pulse is generated), the leading edge of each message appear above its respective slit in the mask. The physical positions of the messages on the disc is of no importance, as long as the out-putting of any message begins at the time that a start pulse is generated (or a few milliseconds thereafter).

The reason that multiple announcements are sometimes heard can be best appreciated by disregarding for the moment the fact that OR gate 6 on FIG. 2 is energized when the "tens" digit represented by analog-to-digital converter 19 is any one of the numbers 0, 1 or 2. It will be recalled that the only reason for assuming that a zero crossing has occurred when the aircraft is anywhere within the 30-foot band around a true "hundreds" level is that at the speed at which the analog-to-digital converter 19 operates, successive samples appearing at 0.4-second intervals, a "true" crossing might otherwise be missed. With a faster conversion rate, it is possible to look for only a "zero" digit in the "hundreds" position of the converter output, and it will be assumed for the moment that this is the case.

It will be recalled that the output of comparator 28 is high whenever the instantaneous altitude is at least 1 foot below the altitude represented by the last sample stored in sample-and-hold circuit 27. Due to the provision of capacitor 32, the output of amplifier 34 remains high for 1.5 seconds even after the output of the comparator goes low. At the start of an ascent, the instantaneous altitude may be less than the altitude represented by the last sample. Thus during the initial portion of the ascent, the comparator output may remain high. But as soon as the aircraft rises to an altitude only 1 foot below that represented by the last sample, the comparator output goes low. The output of amplifier 34 goes low 1.5 seconds later. Thus following the start of an ascent, the negative-rate signal on conductor 36 remains high for at least 1.5 seconds.

Suppose that the aircraft descended through a "hundreds" level. During the descent the negative-rate signal was high, and as soon as the zero-crossing event was detected the need for an announcement was registered, resulting in an announcement being made at the start of the next message-playing cycle. Suppose further that the aircraft descended several feet below the true "hundreds" level, and then started to ascend. (The ascent may not be "real", but rather the result of terrain variations.) If the aircraft rises through the true "hundreds" level, resulting in the generation of another zero crossing pulse, while the negative-rate signal is still high due to the time delay of at least 1.5 seconds before the output of amplifier 34 goes low, the logic will treat the event as representing a need for an announcement, and the same numerical-value announcement will be heard. Suppose that the aircraft then rises several feet above the true "hundreds" level. As soon as it starts to descend again (once more, perhaps due to terrain variations), the negative-rate signal goes high immediately once again, even if it had previously gone low, and as the aircraft passes through the true "hundreds" level the detection of another zero crossing results in the repetition of the same announcement. In this case, it is not the persistence of the negative-rate signal for at least 1.5 seconds after the start of an ascent which is the cause of the repetitious announcement, but rather the fact that any descent through any true "hundreds" level results in the triggering of an anouncement because the negative-rate signal goes high almost immediately upon the start of a descent. The fact that a zero crossing is registered not when the true "hundreds" level is crossed, but rather whenever the aircraft first enters a 30-foot band around the true "hundreds" level makes little difference. Repetitious announcements may result whenever the aircraft descends below the band and then ascends into it, or whenever the aircraft ascends above the band and then descends into it. (One of the advantages of the 30-foot band is that multiple announcements do not occur while the aircraft's altitude changes within the band.)

Figure 8:
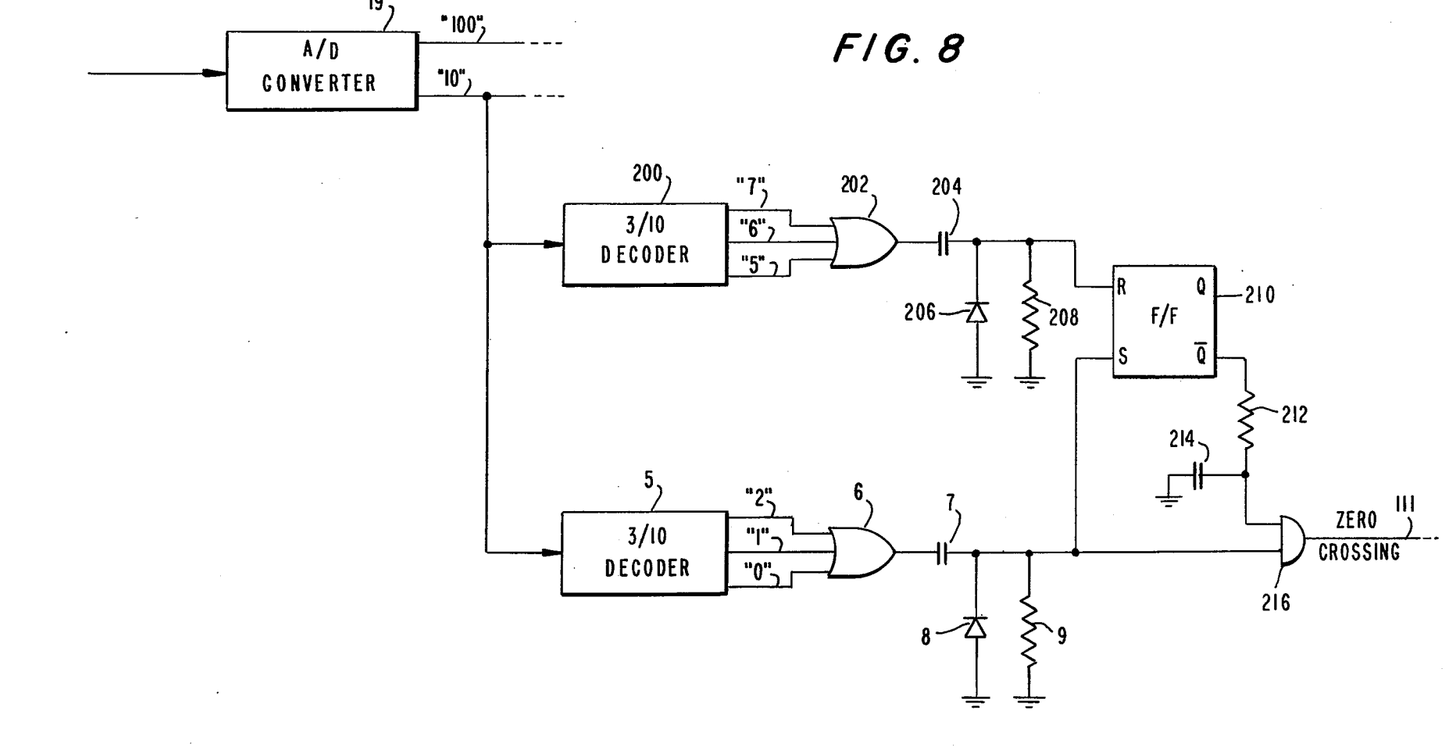
FIG. 8 depicts the changes required in accordance with the principles of the present invention.

Repetitious announcements are substantialy eliminated with the use of the zero-crossing detection logic shown in FIG. 8. The "tens" output of A/D converter 19 is extended to 3-out-of-10 decoder 5 as shown in FIGS. 1 and 2. Elements 6-9 are the same as those shown in FIG. 2. But instead of the junction of the capacitor, diode and resistor being connected directly to zero-crossing conductor 111, the junction is connected to one input of AND gate 216. The pulse extended through capacitor 7 is transmitted through the gate to conductor 111 only if the other input to the AND gate is high.

The remaining elements shown in FIG. 8 are those which enable a zero-crossing event to be detected only if the previous zero-crossing was followed by a 50-crossing, i.e., the aircraft passes through a level midway between two "hundreds" levels. In theory, a 50-crossing can be detected by looking only for a 5 digit in the "tens" output of converter 19. But in order that a 50-crossing not be missed due to the converter up-dating its output only at 0.4-second intervals, a 50-crossing is assumed to occur if the "tens" output of the converter is any one of the digits 5, 6 or 7. For any one of these conditions, one of the outputs of 3-out-10 decoder 200 goes high to energize the output of OR gate 202. Capacitor 204, diode 206 and resistor 208 serve the same functions as capacitor 7, diode 8, and resistor 9. Whenever a first one of the three outputs of decoder 200 goes high, a positive pulse appears at the junction of capacitor 204, diode 206 and resistor 208. As long as any one of the decoder outputs remains high, even though the outputs switch, no other pulse is generated. Only a single pulse is generated from the time that the aircraft first enters a 30-foot band around a mid-"hundreds" level until it leaves the band. The level extends from 75 feet above a true "hundreds" level (at which point the "7" output of decoder 200 goes high) to 45 feet above the true "hundreds" level (at which point the "5" output of the decoder goes low).

Capacitor 7 is connected to the set input of flip-flop 210, and capacitor 204 is connected to the reset input of the flip-flop. Assume that the flip-flop is initially in the 0 state with the Q output being high in potential. In such a case, the high potential is extended through resistor 212 to enable AND gate 216. When the next zero-crossing pulse is extended through capacitor 7, it passes through the AND gate to zero-crossing conductor 111 to control the triggering of an announcement (providing that at this time the negative-rate signal is high to indicate a descent). This same pulse sets the flip-flop in the 1 state. The Q output now goes low to disable AND gate 216. Until the flip-flop is reset in the 0 state, additional zero-crossing pulses extended through capacitor 7 are not transmitted through gate 216. Resistor 212 and capacitor 214 function as a delay network so that gate 216 remains enabled long enough to allow the zero-crossing pulse which sets the flip-flop in the 1 state to pass through gate 216 before the gate is disabled. Without this delay network, it is possible that the flip-flop will change state so fast that the zero-crossing pulse which causes the state to change will not be transmitted through the AND gate.

The only way that another zero-crossing pulse can be extended to conductor 111 is if the flip-flop is first reset. And the flip-flop is reset only upon the detection of a 50-crossing. Consequently, it is apparent that a zero-crossing pulse on conductor 111 can follow another pulse on this conductor only if in between two passes through the same or different "hundreds" levels, the aircraft passes through a mid-"hundreds" level.

During a normal descent, crossings through "hundreds" levels alternate with crossings through mid-"hundreds" levels. Consequently, every crossing through a "hundreds" level results in the generation of a zero-crossing pulse on conductor 111, and the numerical value messages are heard in a decreasing sequence. The main advantage of the invention is that as an aircraft is circling and the terrain varies, repetitious announcements are rarely heard. Were the logic to detect the crossing of true "hundreds" levels and the crossing of true mid-"hundreds" levels, the only way that the same numerical value announcement could be heard twice in succession would be if the aircraft ascended 50 feet above or descended 50 feet below the "hundreds" level which resulted in the out-putting of the last announcement, followed by an equally large change in altitude in the opposite direction. Even with the 30-foot ranges around the "hundreds" and mid-"hundreds" levels in the illustrative embodiment of the invention, repetitious announcements are unlikely. The "700" announcement will be heard, for example, following a descent of the aircraft through a level of 725 feet. If the aircraft then starts to ascend above this level and then descends through it once again, another "700" announcement will be heard only if during the ascent a level of 745 feet was reached. Consequently, there is a 20-foot guard band through which the aircraft must ascend above the top of the zero-crossing band in order for a repetitious announcement to be made. Similarly, once the aircraft descends below 695 feet, the same "700" announcement will be triggered during an ascent only if the aircraft first descended to the 675-foot level, there thus being a 20-foot guardband below each zero-crossing band as well as above it.

Although the invention has been described with reference to a particular embodiment, it is to be understood that this embodiment is merely illustrative of the application of the principles of the invention. For example, rather than to allow either of the mid-"hundreds" levels on the two sides of a "hundreds" level to result in the resetting of flip-flop 210, the logic can be designed to allow only the lower mid-"hundreds" level to reset the flip-flop. Such a design would result in numerical value announcements only in descending order, and would still cut down on some of the repetitious messages. The important thing is that there be at least one band, separated from the band which includes the "hundreds" level, into which the aircraft must enter before the annunciator is enabled following a previous announcement. In the limiting case, the band may be a single level (e.g., mid-way between two "hundreds" levels), the band in this case having an infinitesmal width. It should also be noted that if the numerical-value announcements are desired even during an ascent (a result easily achieved by holding the negative-rate conductor 36 high at all times), the guard-band technique of our present invention still reduces the number of repetitious announcements. Thus it is to be understood that numerous modifications may be made in the illustrative embodiment of the invention and other arrangements may be devised without departing from the spirit and scope of the invention.

What we claim is:

1. A system for use in an aircraft to announce altitude-related messages, said aircraft having means for generating a signal representative of the aircraft altitude, said system comprising means for storing a plurality of verbal messages, at least some of said messages corresponding to respective aircraft altitudes, means for playing a selected one of said messages, means for selecting one of said messages when the altitude represented by said altitude signal is in a respective range of a first group of ranges, a different range in said first group being associated with each message and all of the ranges being disconnected from each other, means for deriving a negative-rate signal representative of a decreasing altitude, means responsive to the simultaneous derivation of said negative-rate signal and the operation of said message-selecting means for controlling said message-playing means to play the selected message and thereafter for disabling subsequent operation of said message-playing means independent of another operation of said message-selecting means, a second group of ranges all disconnected from each other and all disconnected from the ranges in said first group, the ranges in said first and second groups alternating with each other in the order of increasing altitudes, and means responsive to said altitude signal representing an altitude in one of the ranges in said second group adjacent the range in said first group in accordance with which the last-played message was selected for enabling subsequent operation of said message-playing means.

2. A system in accordance with claim 1 wherein said enabling means operates responsive to a positive change in said altitude signal from within one of the ranges in said first group to the adjacent higher range in said second group and a negative change in said altitude signal from within one of the ranges in said first group to the adjacent lower range in said second group.

3. A system in accordance with claim 2 wherein at least several of said messages are indicative of respective numerical values of altitude, and said message-selecting means selects one of the numerical-value messages responsive to said altitude signal representing an altitude within a range in said first group which includes the respective numerical value.

4. A system in accordance with claim 3 wherein said at least several messages represent altitudes measured in hundreds of feet, and said message-selecting means selects one of such messages when the altitude signal represents an altitude within a range in said first group of several tens of feet, which range includes the respective "hundreds" level.

5. A system in accordance with claim 4 wherein the ranges in said first and second groups are all separated from each other by at least 20 feet.

6. A system in accordance with claim 1 wherein at least several of said messages are indicative of respective numerical values of altitude, and said message-selecting means selects one of the numerical-value messages responsive to said altitude signal representing an altitude within a range in said first group which includes the respective numerical value.

7. A system in accordance with claim 6 wherein said at least several messages represent altitudes measured in hundreds of feet, and said message-selecting means selects one of such messages when the altitude signal represents an altitude within a range in said first group which includes the respective "hundreds" level.

8. A system in accordance with claim 7 wherein the ranges in said first and second groups are all separated from each other by at least 20 feet.

9. A system in accordance with claim 8 wherein said negative-rate signal deriving means includes means for sampling periodically said altitude signal, means for comparing said altitude signal with the last-taken sample to determine a decrease in altitude since the last sample was taken, and means for generating said negative-rate signal for as long as a decrease in altitude is determined and for a short predetermined time interval thereafter.

10. A system in accordance with claim 1 wherein said negative-rate signal deriving means includes means for sampling periodically said altitude signal, means for comparing said altitude signal with the last-taken sample to determine a decrease in altitude since the last sample was taken, and means for generating said negative-rate signal for as long as a decrease in altitude is determined and for a short predetermined time interval thereafter.

11. A system for use in an aircraft to announce altitude-related messages, said aircraft having means for generating a signal representative of the aircraft altitude, said system comprising means for storing a plurality of verbal messages, at least some of said messages corresponding to respective aircraft altitudes, means for selecting one of said messages when the altitude represented by said altitude signal is in a respective range of a first group of ranges, a different range in said first group being associated with each message and all of the ranges being disconnected from each other, means for playing the selected one of said messages and thereafter for disabling its subsequent operation independent of another operation of said message-selecting means, a second group of ranges all disconnected from each other and all disconnected from the ranges in said first group, the ranges in said first and second groups alternating with each other in the order of increasing altitudes, and means responsive to said altitude signal representing an altitude in one of the ranges in said second group adjacent the range in said first group in accordance with which the last-played message was selected for enabling subsequent operation of said message-playing means.

12. A system in accordance with claim 11 wherein said enabling means operates responsive to a positive change in said altitude signal from within one of the ranges in said first group to the adjacent higher range in said second group and a negative change in said altitude signal from within one of the ranges in said first group to the adjacent lower range in said second group.

13. A system in accordance with claim 12 wherein at least several of said messages are indicative of respective numerical values of altitude, and said message-selecting means selects one of the numerical-value messages responsive to said altitude signal representing an altitude within a range in said first group which includes the respective numerical value.

14. A system in accordance with claim 13 wherein said at least several messages represent altitudes measured in hundreds of feet, and said message-selecting means selects one of such messages when the altitude signal represents an altitude within a range in said first group of several tens of feet, which range includes the respective "hundreds" level.

15. A system in accordance with claim 14 wherein the ranges in said first and second groups are all separated from each other by at least 20 feet.

16. A system in accordance with claim 11 wherein at least several of said messages are indicative of respective numerical values of altitude, and said message-selecting means selects one of the numerical-value messages responsive to said altitude signal representing an altitude within a range in said first group which includes the respective numerical value.

17. A system in accordance with claim 16 wherein said at least several messages represent altitudes measured in hundreds of feet, and said message-selecting means selects one of such messages when the altitude signal represents an altitude within a range in said first group of several tens of feet, which range includes the respective "hundreds" level.

18. A system in accordance with claim 17 wherein the ranges in said first and second groups are all separated from each other by at least 20 feet.

* * * * *